United States Patent
Jeong

(10) Patent No.: US 7,869,845 B2
(45) Date of Patent: Jan. 11, 2011

(54) SLIDING TYPE MOBILE TERMINAL

(75) Inventor: June-Wook Jeong, Incheon (KR)

(73) Assignee: LG Electronics Inc., Seoul (KR)

( * ) Notice: Subject to any disclaimer, the term of this patent is extended or adjusted under 35 U.S.C. 154(b) by 370 days.

(21) Appl. No.: 11/649,758

(22) Filed: Jan. 5, 2007

(65) Prior Publication Data

US 2008/0119249 A1    May 22, 2008

(30) Foreign Application Priority Data

Nov. 17, 2006    (KR)    ....................... 10-2006-0114148

(51) Int. Cl.
*H04M 1/00*    (2006.01)
(52) U.S. Cl. ........................... 455/575.4; D14/138 AD
(58) Field of Classification Search ............. 455/575.1, 455/575.4; D14/138 AD, 138 AB; 345/168, 345/169
See application file for complete search history.

(56) References Cited

U.S. PATENT DOCUMENTS

| | | | | |
|---|---|---|---|---|
| 4,027,129 | A * | 5/1977 | Sato ........................... 200/535 |
| 5,841,849 | A * | 11/1998 | Macor ..................... 379/142.17 |
| 6,332,024 | B1 * | 12/2001 | Inoue et al. ............. 379/433.06 |
| 6,397,084 | B1 | 5/2002 | Wicks et al. |
| 6,542,721 | B2 * | 4/2003 | Boesen ..................... 455/553.1 |
| 6,717,572 | B1 * | 4/2004 | Chou et al. .................. 345/157 |
| 6,785,565 | B2 * | 8/2004 | Gventer .................... 455/575.4 |
| 6,954,181 | B2 * | 10/2005 | Park et al. .................... 343/702 |
| D552,580 | S * | 10/2007 | Mun .................... D14/138 AD |
| D553,599 | S * | 10/2007 | Lee et al. .............. D14/138 AC |
| D586,804 | S * | 2/2009 | Rak et al. ................... D14/346 |
| 7,569,781 | B2 * | 8/2009 | Lam et al. .................... 200/5 R |
| 2001/0009847 | A1 * | 7/2001 | Kim et al. ..................... 455/90 |
| 2002/0086698 | A1 * | 7/2002 | Sawada et al. .............. 455/550 |
| 2004/0189597 | A1 | 9/2004 | Amitani et al. |
| 2004/0203496 | A1 * | 10/2004 | Bae et al. .................... 455/90.1 |
| 2004/0209577 | A1 | 10/2004 | Park et al. |
| 2005/0064921 | A1 * | 3/2005 | Jeong et al. .............. 455/575.4 |
| 2005/0068337 | A1 | 3/2005 | Duarte et al. |
| 2005/0083642 | A1 * | 4/2005 | Senpuku et al. ............. 361/681 |
| 2006/0111052 | A1 * | 5/2006 | Gartrell ..................... 455/90.3 |
| 2007/0164036 | A1 * | 7/2007 | Brandenburg ............... 220/676 |
| 2008/0080919 | A1 * | 4/2008 | Rak et al. .................... 400/486 |

FOREIGN PATENT DOCUMENTS

CN    1602027 A    3/2005

* cited by examiner

*Primary Examiner*—Kent Chang
*Assistant Examiner*—Marcus Hammonds
(74) *Attorney, Agent, or Firm*—Birch, Stewart, Kolasch & Birch, LLP

(57) ABSTRACT

A mobile terminal having a first body, a second body slidably attached to the first body, the second body being movable between an open and a closed position, and an input device at an exterior surface of the mobile phone that is exposed when the second body is in the closed position. The input device being located on the first body and having a roller member and at least one button adjacent the roller member.

13 Claims, 5 Drawing Sheets

SLIDING TYPE MOBILE TERMINAL

CROSS REFERENCE TO RELATED APPLICATIONS

This application claims the benefit of Korean Patent Application No. 10-2006-0114148, filed Nov. 17, 2006, and is herein incorporated by reference.

BACKGROUND OF THE INVENTION

1. Field of the Invention

The present invention is generally directed to sliding type mobile terminals and more particularly, to sliding type mobile terminals having an input device on the exterior surface such that it is accessible when the mobile terminal is in a closed position.

2. Description of Related Art

Generally, an apparatus for mobile communication is a mobile terminal, such as a mobile phone, a PDA and the like. The mobile terminal, which is portable, enables a user to exchange various kinds of information such as pictures, voices, characters and the like with a correspondent user via wireless communications or receive various services by accessing a prescribed server.

As additional features are added, conventional mobile terminals add input devices that are designed to appropriately operate the additional features. Generally, these input devices extend above the exterior surface of the mobile terminal in such a manner as to affect the aesthetics of the mobile terminal. In addition, these input devices detract from the overall slimness of the mobile terminal.

BRIEF SUMMARY OF THE INVENTION

Therefore, there is a need for a mobile phone capable of enhancing an appearance thereof by providing an input device that does not detract from the overall aesthetic appeal of the phone. In addition, it is desirable that the input device be accessible regardless of whether the mobile terminal is in an open or closed position.

To achieve these and other advantages and in accordance with the purpose of the present invention, as embodied and broadly described herein, there is provided a mobile terminal having a first body, a second body slidably attached to the first body, the second body being movable between an open and a closed position, and an input device at an exterior surface of the mobile phone that is exposed when the second body is in the closed position, the input device being located on the first body. The input device includes a roller member and at least one button adjacent the roller member.

In another aspect, the at least one button includes a pair of buttons, each button being located at opposite ends of the roller member.

In a different aspect, the first body includes an upper region and the input device is located in the upper region. The second body may include a cutout region that corresponds to the shape of the upper region. A cover having a pair of buttons may also be provided, and the cover may be arranged in the cutout region of the second body. In addition, a pair of switches may be disposed beneath the cover, each switch being associated with one of the pair of buttons formed in the cover.

In a different aspect a cover may be located on the upper region and the input device may extend through the cover. As above, the cover may include a pair of buttons formed in the cover. A pair of switches may be disposed beneath the cover, each switch being associated with one of the pair of buttons formed in the cover.

In a different aspect, the roller member is rotatable in both a forward and rearward direction. The roller member may also be pressable in a vertical direction towards the first body. The at least one button adjacent the roller member may also be pressable in a vertical direction towards the first body. In addition, the at least one button may include a pair of buttons, each button being located at opposite ends of the roller member. A cover may be located on the upper region and the input device extends through the cover portion. Similarly, the cover may include a pair of buttons formed in the cover. A pair of switches may be disposed beneath the cover, each switch being associated with one of the pair of buttons formed in the cover.

In a different aspect, an antenna may be located in the first body beneath the input device.

In yet another aspect, the second body may include a display formed therein and the first body may include a keypad that is exposed when the second body is moved with respect to the first body.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Reference will now be made in detail to the exemplary embodiments of the present invention, examples of which are illustrated in the accompanying drawings. Hereinafter, a mobile terminal according to the present invention will be explained in more detail.

Figure 1:
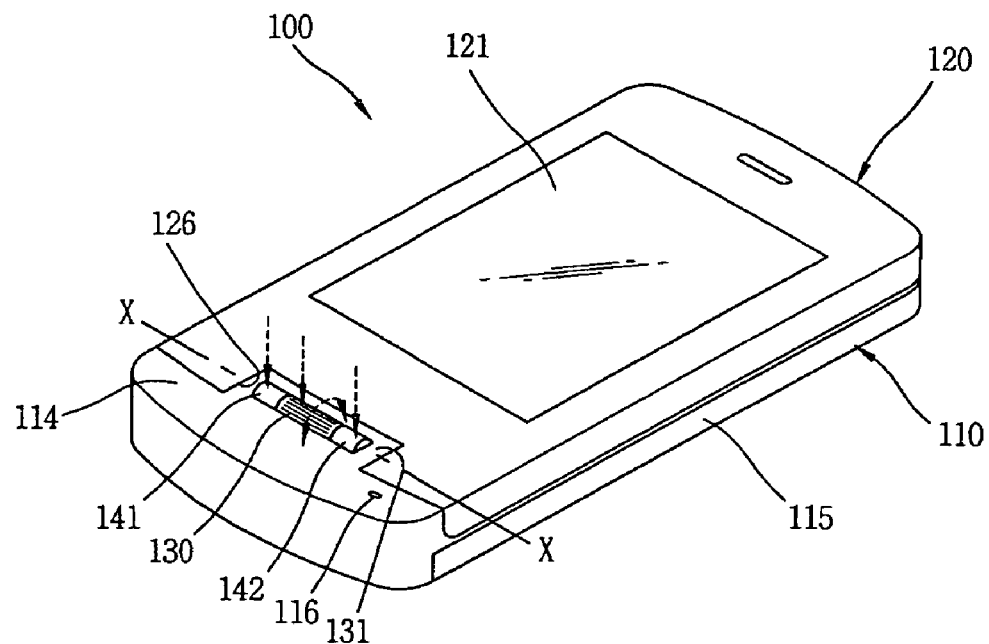
FIG. 1 shows a front perspective view of a mobile terminal according to a first exemplary embodiment of the present invention.
Figure 2:
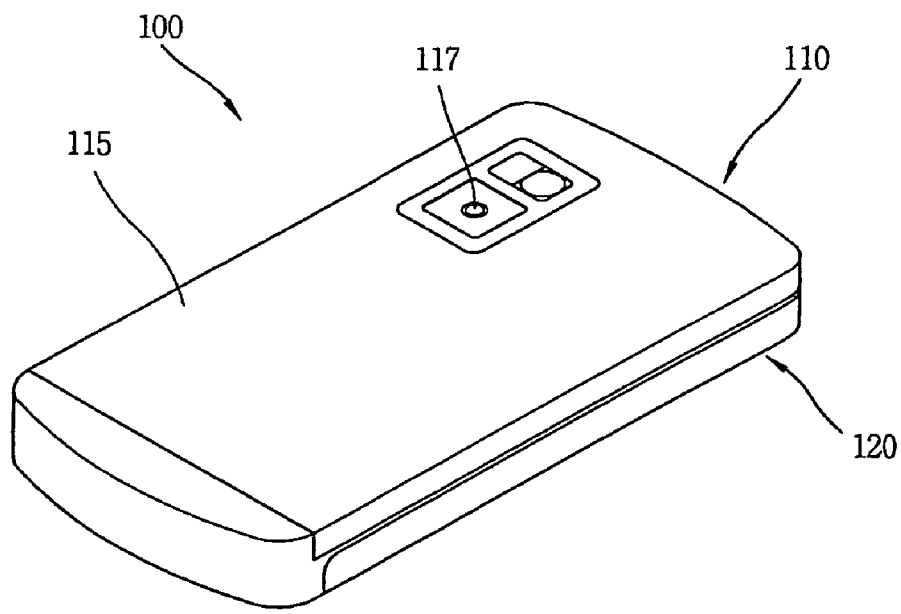
FIG. 2 shows a rear perspective view of the mobile of FIG. 1.
Figure 3:
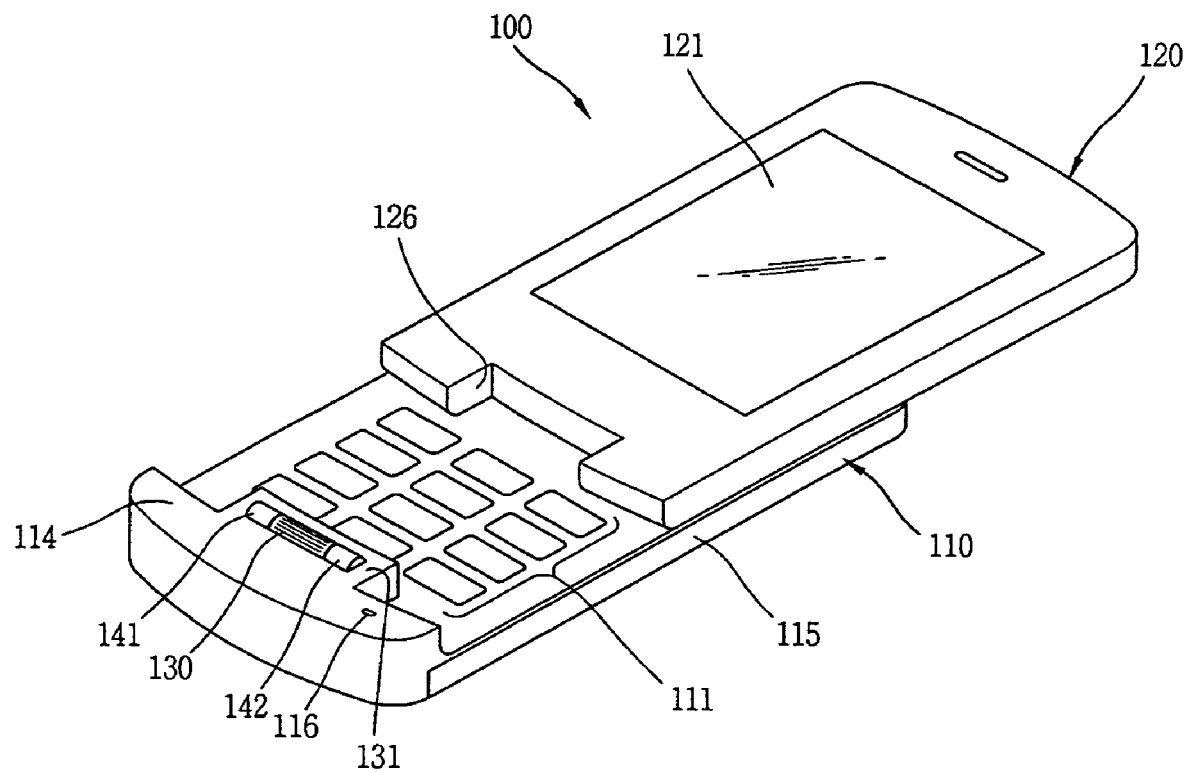
FIG. 3 shows a front perspective view of the mobile terminal of FIG. 1 in an open position.

FIGS. 1 to 3 are perspective views showing an appearance of a mobile terminal 100 according to a first exemplary embodiment of the present invention. While the description that follows is directed to mobile terminals, the present invention may be applied to other portable devices including, but not limited to, PDAs, portable game devices, portable music players, or portable calculators.

The mobile terminal 100 includes a first body 110 and a second body 120 that is moveable with respect to the first body 110. As shown in the exemplary embodiments, the second body 120 is shorter than the first body 110 such that an upper region 114 of the first body 110 is always exposed regardless of whether the mobile terminal 100 is in an open position or a closed position.

A roller member 130 is partially located within upper region 114 and partially extends through upper surface 131 of the upper region 114. The roller member 130 is rotatable about a longitudinal axis X-X. The roller member 130 can rotate both forwards and backwards to output a directional signal that can control a pointer or menu selector displayed on display 121 of the second body 120. For example, it can be used to select either a yes or no input from a menu displayed on display 121.

In addition to controlling a pointer on display 121, the roller member can cooperate with a camera 117 to take photographs or video, which can be displayed on display 121. As seen in FIG. 2, the camera 117 is disposed in a rear surface of the first body 110. In addition, a cover 115 is provided to protect both a battery of the mobile terminal 100 and to surround the camera 117. In this manner, photographs and video can be taken regardless of whether the mobile terminal 100 is in the open or closed position.

A microphone 116 may be provided in the upper region 114 of the first body 110.

As shown in FIG. 3, a keypad 111 having a plurality of keys for inputting characters or other command by a user is exposed when the second body 120 is moved into an open position. In addition, a cutout portion 126 corresponding to the upper region 114 is formed in the second body 120.

In addition to the roller member 130, buttons 141, 142 are located adjacent the roller member 130 that are pressable in the direction indicated by the arrows. The buttons 141, 142 can be used to scroll to the left and right on the display 121 as well as to input corresponding function indicated on the display. Similarly, roller member 130 is displaceable in the direction indicated by the arrow to also indicate a selection of a menu option or other function indicated in the display. Greater detail regarding the roller member 130 and buttons 141, 142 will be provided with reference to FIG. 8.

The roller member 130 and buttons 141, 142 can all be used together to control a pointer on display 121 and can be assigned various commands that are useable by the user. For example, the roller member can be used to scroll through a menu or sub-menu, while the buttons 141, 142 are used to navigate left and right. Or depending on the particular use of the mobile terminal 100, such as the camera feature, the roller member 130, or buttons 141, 142 can be used to zoom in an out while the other buttons may be used to take the picture displayed on display 121. The roller member 130 and buttons 141, 142 can also cooperate with keypad 111 when the second body 120 is open to provide even greater functionality. In addition, the roller member 130 and buttons 141, 142 can perform different functions depending on whether the mobile terminal 100 is open or closed. For example, the roller member 130 can function as the enter command for the keypad 111. The various functions of the roller member 130 and buttons 141, 142 are not limited to just those described, but can be assigned any relevant functions provided for by the mobile terminal 100.

Figure 4:
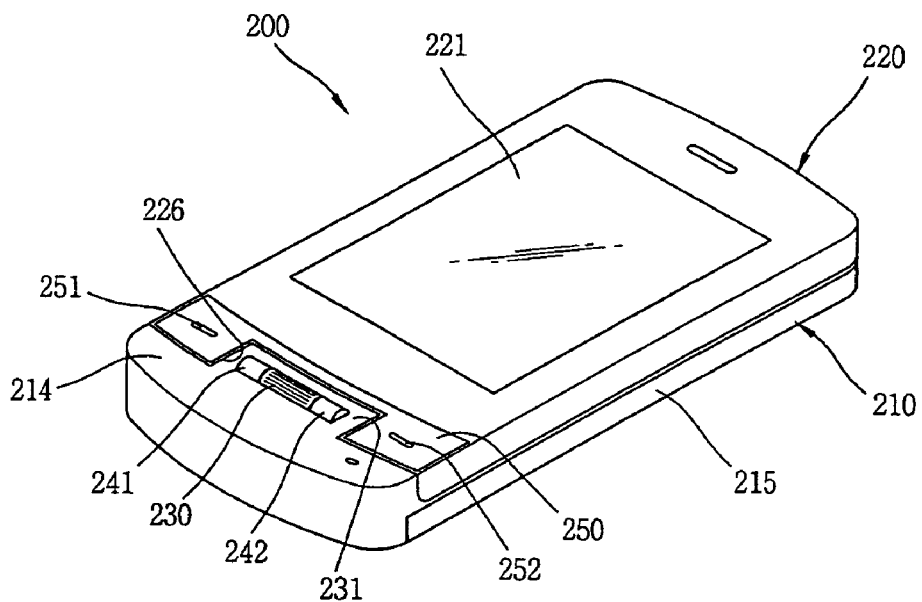
FIG. 4 shows a front perspective view of a mobile terminal according to a second exemplary embodiment of the present invention.

A second exemplary mobile terminal 200 is shown in FIG. 4. The second body 220 includes cutout portion 226 that has a second set of buttons, or cover buttons 251, 252 formed in the upper surface thereof. Particularly, a cover 250 having cover buttons 251, 252 formed therein is provided such that the cover 250 forms an exterior surface of the second body 220. The cover buttons 251, 252 are independently pressable.

Figure 5:
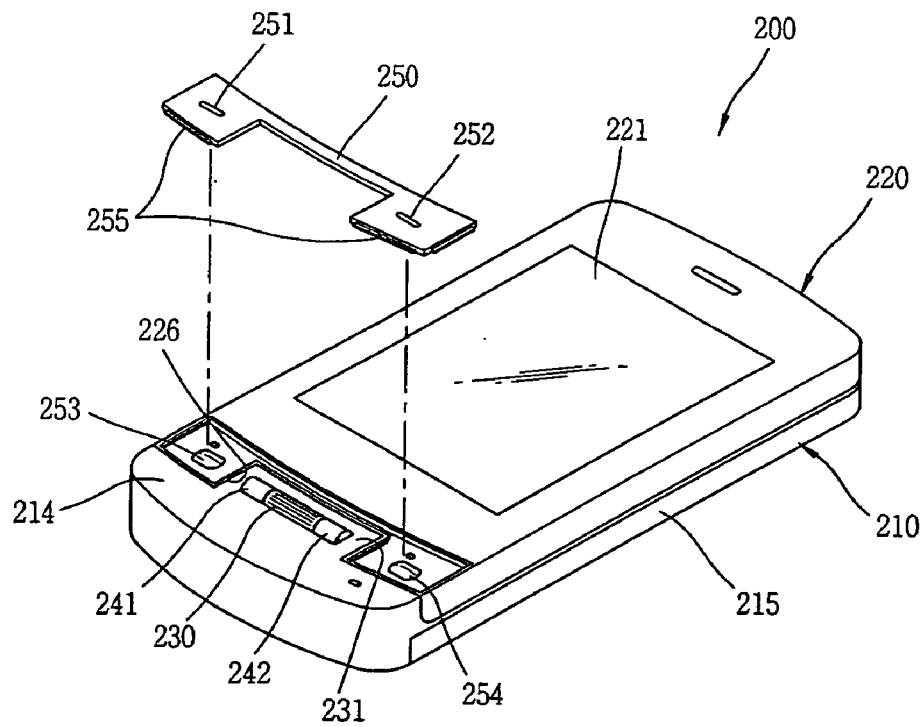
FIG. 5 shows a partially exploded view of FIG. 4.

As shown in FIG. 5, pair of dome switches 253, 254 is arranged beneath the cover buttons 251, 252, respectively of the cover 250. When the cover 250 is pressed downward one or both of the dome switches 253, 254 are pressed and a corresponding signal is sent to control a pointer or other function displayed on display 221.

Preferably, the cover 250 can be formed of a thin metal plate that includes a plurality of stopping elements 255. Each of the stopping elements 255 can engage an inner surface of the second body 220 to prevent the cover from extending beyond the exterior of the second body 220. In addition, the second body 220 can be configured so that the stopping elements 255 are not visible from outside the mobile terminal 200.

Because the cover 250 and cover buttons 251, 252 are provided on an exterior of the second body 220, they can be operated regardless of whether the second body 220 is in the open or closed position. The cover buttons 251, 252 provide added functionality similar to those provided by the roller member 230 and buttons 241, 242. Further detail regarding the arrangement of the dome switches 253, 254 and the cover buttons 251, 252 will be made with reference to FIG. 8 below.

The remaining parts of the mobile terminal 200 are similar to those describe above regarding the first exemplary embodiment and will not be discussed further.

Figure 6:
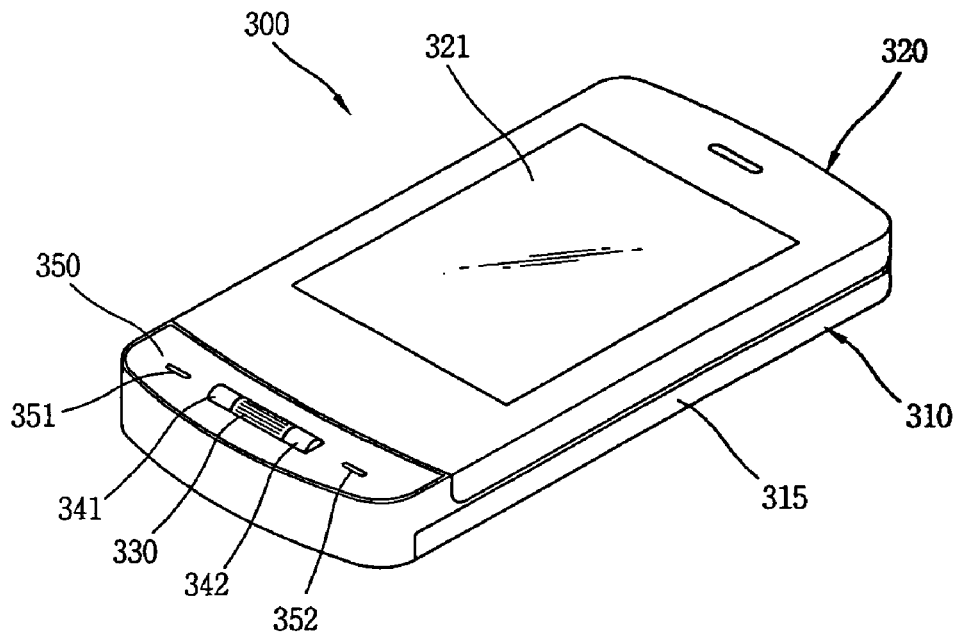
FIG. 6 shows a front perspective view of a mobile terminal according to a third exemplary embodiment of the present invention.
Figure 7:
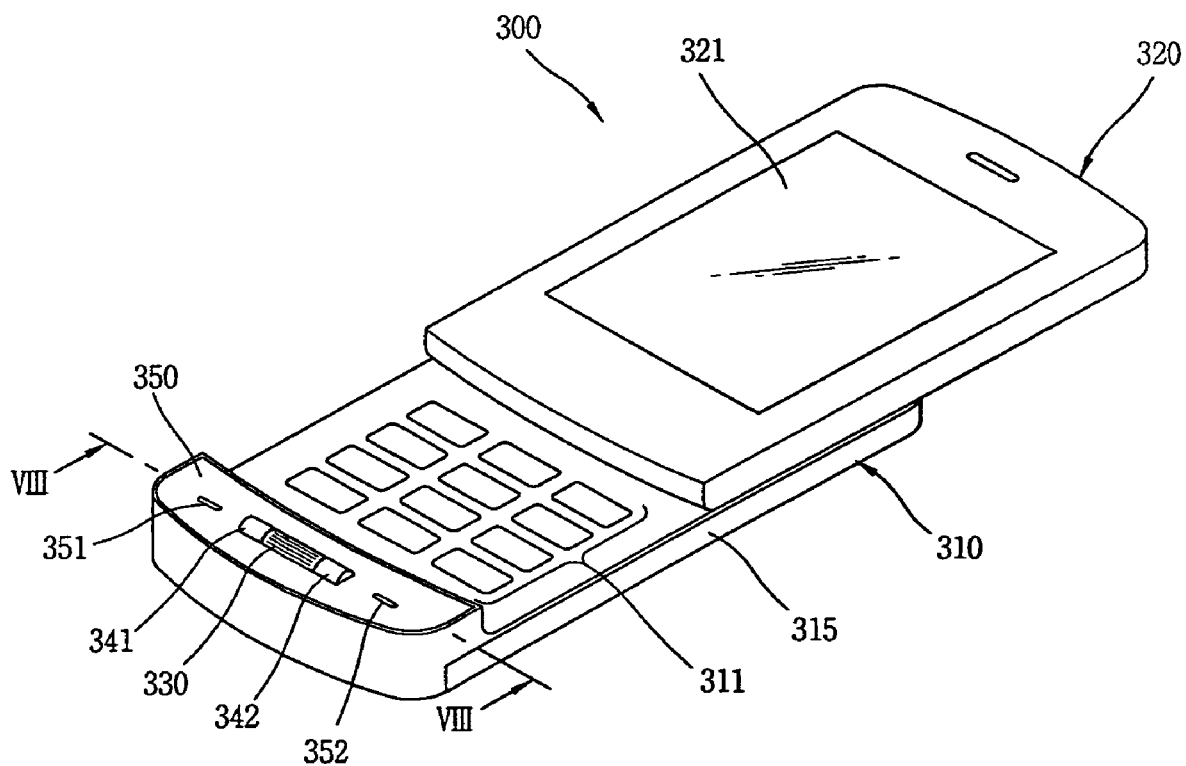
FIG. 7 shows a front perspective view of the mobile terminal of FIG. 6 in an open position.
Figure 8:
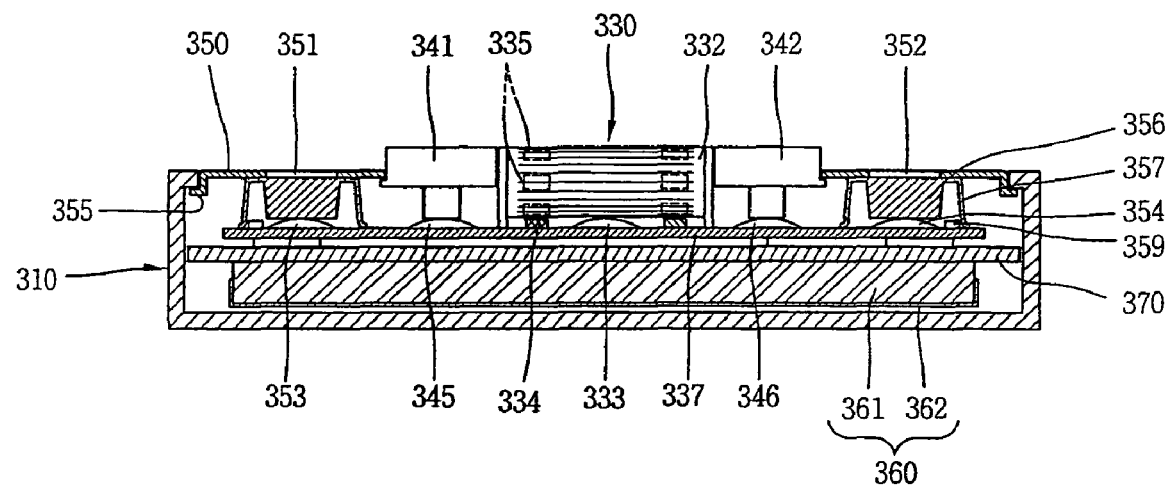
FIG. 8 shows a cross-sectional view of the mobile terminal taken along line VIII-VIII of FIG. 7.

A mobile terminal 300 according to a third exemplary embodiment is shown in FIGS. 6 to 8. In this exemplary embodiment, the second body 320 is moveable between an open and closed position to expose a keypad 311. In addition, the cutout portion of the first and second exemplary embodiments has been eliminated and a cover 350, and cover buttons 351, 352 have been provided on the first body 310. As a result, the roller member 330, buttons 341, 342, cover buttons 351, 352, and cover 350 are exposed independent of whether the second body 320 is open or closed and they also provide for a smooth appearance on the upper surface of the first body 310.

FIG. 8 shows an exemplary profile of the roller member 330, buttons 341, 342, and cover buttons 351, 352 taken along line VIII-VIII of FIG. 7. In particular, the roller element 330 includes a cylindrical wheel 332 having a plurality of magnets 335 equally spaced about the circumference of the cylindrical wheel 332. A sensor 334 is arranged beneath the cylindrical wheel 332 and senses the rotational direction of the roller member 330 and converts it to a signal.

In addition, the cylindrical wheel 332 is pressable in a vertical direction with respect to the first body 310 to contact a switch 333 located under the cylindrical wheel 332. Similarly, switches 345, 346 are provided beneath buttons 341, 352. Each of the switches 333, 345, 346 is located on a circuitry supporting substrate 337.

When a user presses the cover 350 or one of the cover buttons 351, 352, the corresponding switches 353, 354 are pressed. Pressing protrusions 356 are formed beneath the cover buttons 351, 352 and engage switches 353, 354, respectively, when the cover 350 is pressed. The pressing protrusions 356 may be attached by adhesive or otherwise formed on an inner surface of the cover 350.

Adjacent each of the switches 353, 354 are located light emitters 359. The light emitters 359 may be formed directly on the circuitry supporting substrate 337 and may be a light emitting diode or semiconductor laser that illuminate the cover buttons 351, 352. Shields 357 may be provided for each button 351, 352 to help direct the light towards the pressing protrusions 356. Because the pressing protrusions 356 can be formed of light transmissive material, the buttons 351, 352 can be illuminated.

The cover 350 includes stopping portions 355 that press against the interior of the first body 310 to prevent the cover 350 from extending beyond the exterior surface of the first body 310. The pressing protrusions 356 and shields 357 assist in pressing the cover 305 against the first body 310.

Because the second body 320 is thin, an antenna 360 can be disposed in the first body 310 without detrimentally increasing the size of the mobile terminal 300. The antenna 360 is attachable to a circuitry supporting substrate 370. As shown, the antenna 360 includes a carrier 361 and radiation body 362.

Figure 9:
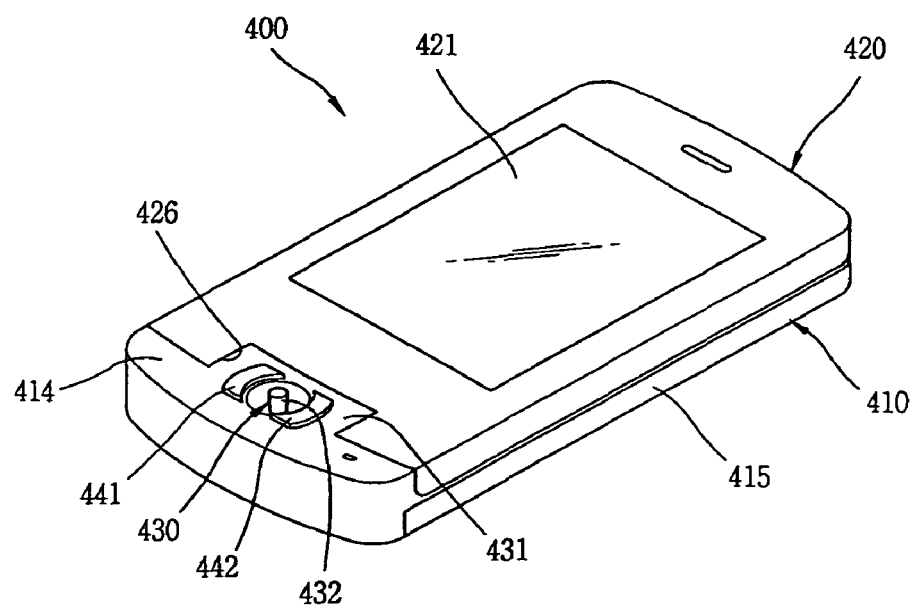
FIG. 9 shows a front perspective view of a mobile terminal according to a fourth exemplary embodiment of the present invention.

A fourth exemplary embodiment of a mobile terminal 400 is shown in FIG. 9. In this embodiment, the roller member has been replaced with a pivotal member 430 having a stem 432 that extends from the first body 410. The pivotal member controls a pointer or other functions displayed on display 421. The pivotal member 430 can be moved in multiple directions, but otherwise functions similarly to the roller members and other buttons described previously.

Accordingly, the present invention allows for a user to control the mobile terminal via selection of menu items or controlling a pointer regardless of whether the mobile terminal is in an open or closed position.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A mobile terminal comprising:
   a first body;
   a second body slidably attached to the first body, the second body being movable between an open and a closed position; and
   an input device at an exterior surface of the mobile terminal that is exposed when the second body is in the closed position, the input device being located on the first body, the input device including:
      a roller member having a substantially cylindrical body with opposing ends, the roller member being rotatable about a longitudinal axis, a portion of the roller member extending above the exterior surface;
      a pair of buttons located adjacent each opposing end of the roller member, each button extending above the exterior surface the same extent as the portion of the roller member, each button having a shape corresponding to the portion of the roller member so as to provide a common profile with the roller member;
      a cover surrounding the roller member and the pair of buttons, the cover forming a portion of the exterior surface of the mobile terminal, the cover having a pair of cover buttons formed therein that are independently pressable; and
      a pair of switches disposed beneath the cover, each switch being associated with one of the pair of cover buttons,
   wherein the button adjacent each opposing end of the roller member is separate from the roller member;
   wherein the first body includes an upper region and the input device is located in the upper region,
   wherein the second body includes a cutout region that corresponds to the shape of the upper region,
   wherein the cover is arranged in the cutout region of the second body.

2. The mobile terminal according to claim 1, wherein the roller member is rotatable in both a forward and rearward direction.

3. The mobile terminal according to claim 2, wherein the roller member is pressable in a vertical direction towards the first body.

4. The mobile terminal according to claim 1, wherein an antenna is located in the first body beneath the input device.

5. The mobile terminal according to claim 1, wherein the second body includes a display formed therein and the first body includes a keypad that is exposed when the second body is moved with respect to the first body.

6. The mobile terminal according to claim 1, further comprising a circuitry supporting substrate, the circuitry supporting substrate including a plurality of switches,
   wherein the roller member is configured to actuate a single switch of the plurality of switches, and
   wherein the button adjacent to each opposing end of the rotatable member is configured to actuate a corresponding switch of the plurality of switches nearest the single switch.

7. The mobile terminal according to claim 1, wherein the first body includes a keypad, the second body is slidably attached to the first body, the second body is movable between the open and the closed position to expose the keypad in the open position and to cover the keypad in the closed position, and the input device is exposed when the second body is in the open position.

8. The mobile terminal according to claim 7, wherein the first body includes an upper region and the input device is located in the upper region.

9. The mobile terminal according to claim 8, wherein the second body includes a cutout region that corresponds to the shape of the upper region.

10. The mobile terminal according to claim 9, wherein the cover is arranged in the cutout region of the second body.

11. The mobile terminal according to claim 7, wherein the roller member is rotatable in both a forward and rearward direction.

12. The mobile terminal according to claim 11, wherein the roller member is pressable in a vertical direction towards the first body.

13. The mobile terminal according to claim 1, wherein the roller, the pair of buttons, and the pair of cover buttons are arranged in a row along the longitudinal axis.

* * * * *